United States Patent

Senda et al.

Patent Number: 5,507,950
Date of Patent: Apr. 16, 1996

[54] FLOATING WATER PURIFICATION DEVICE AND WATER PURIFICATION METHOD

[75] Inventors: Shohei Senda, Ryugasaki; Moriju Hasegawa, Tokyo, both of Japan

[73] Assignee: Resource Biology Research Institute Co., Ltd., Tokyo, Japan

[21] Appl. No.: 461,013

[22] Filed: Jun. 5, 1995

Related U.S. Application Data

[63] Continuation-in-part of Ser. No. 191,995, Feb. 4, 1994, abandoned.

[30] Foreign Application Priority Data

Feb. 5, 1993 [JP] Japan ..................... 5-42217

[51] Int. Cl.$^6$ .................................................. C02F 3/06
[52] U.S. Cl. .................. 210/615; 210/629; 210/150; 210/242.2
[58] Field of Search ................... 210/615, 616, 210/617, 629, 150, 151, 242.1, 242.2, 285, 521

[56] References Cited

U.S. PATENT DOCUMENTS

| 4,008,155 | 2/1977 | Castell | 210/242.1 |
|---|---|---|---|
| 4,263,142 | 4/1981 | Burton | 210/608 |
| 4,876,014 | 10/1989 | Malson | 210/668 |
| 5,071,550 | 12/1991 | Bernhardt | 210/242.2 |
| 5,122,266 | 6/1992 | Kent | 210/150 |
| 5,122,287 | 6/1992 | Hsiung | 210/792 |
| 5,228,998 | 7/1993 | DiClemente et al. | 210/610 |
| 5,326,475 | 7/1994 | Kent | 210/615 |

FOREIGN PATENT DOCUMENTS 2-135191 5/1990 Japan .

*Primary Examiner*—Peter A. Hruskoci
*Assistant Examiner*—Theodore M. Green
*Attorney, Agent, or Firm*—Millen, White, Zelano & Branigan

[57] ABSTRACT

A floating water purification device comprising at least a treatment tank enclosing a certain water area and a float which causes the tank to float in water, is characterized by the treatment tank having a plurality of inner biological supports together with at least one water inlet and one water outlet.

20 Claims, 1 Drawing Sheet ent5,507,950

FLOATING WATER PURIFICATION DEVICE AND WATER PURIFICATION METHOD

CROSS-REFERENCE TO RELATED APPLICATION

This invention is a continuation-in-part of application Ser. No. 08/191,995, filed Feb. 4, 1994, abandoned, which is hereby incorporated in its entirety by reference.

FIELD OF THE INVENTION

This invention relates to a method of purifying polluted water using a water purification device, and more specifically, to a method of eliminating water-bloom using a water purification device which floats and is free to move in water.

BACKGROUND OF THE INVENTION

In recent years, now that environmental pollution and energy saving are coming to be regarded as serious problems, new processes have been developed which bring about the oxidation of organic matter in water via the biological action of microorganisms (e.g., Japanese Tokkai Sho 62-3784, Tokkai Hei 3-127692 and Tokkai Hei 4-222587).

However, despite increasingly serious pollution of the world's lakes and oceans, and the fact that pollution is now affecting even ponds and marshes, no device has yet been developed which provides a solution to the problem.

The inventors, as a result of intensive studies on the purification of polluted water in outdoor locations such as ponds, lakes and marshes, developed a method whereby a treatment tank which floats on the water surface comprising a plurality of biological supports having biological activity extending into the polluted water. Polluted water is efficiently purified without removing it to another location by passing it through the tank. In particular, they found that, when light was shielded from part of the passage through which the polluted water passes, water-bloom dries up and dies so that highly efficient and easy purification can be achieved.

SUMMARY OF THE INVENTION

It is therefore an object of this invention to provide a floating water purification device which can purify outdoor polluted water where it occurs.

It is a further object of this invention to provide a floating water purification device which can, in particular, efficiently purify water polluted by water-bloom.

It is another object of this invention to provide a water purification method which is particularly suitable for purifying ocean, lake and marsh water.

It is yet another object of this invention to provide a water purification method which efficiently eliminates water-bloom.

Upon further study of the specification and appended claims, further objects and advantages of this invention will become apparent to those skilled in the art.

The above objects of the invention are attained by a floating water purification device comprising at least a treatment tank enclosing a certain water area and a float which causes this tank to float in water, characterized in that the treatment tank comprises a plurality of inner biological supports together with at least one water inlet and one water outlet.

The water purification device according to this invention is highly convenient, as it merely has to be installed in water at a suitable location depending on the size of the polluted area. The degree of purification may be increased by selecting the type of biological support or adjusting the speed of polluted water through the tank.

This water purification device is moreover particularly suited to eliminating pollution due to water-bloom.

DETAILED DESCRIPTION OF THE INVENTION

Figure 1:
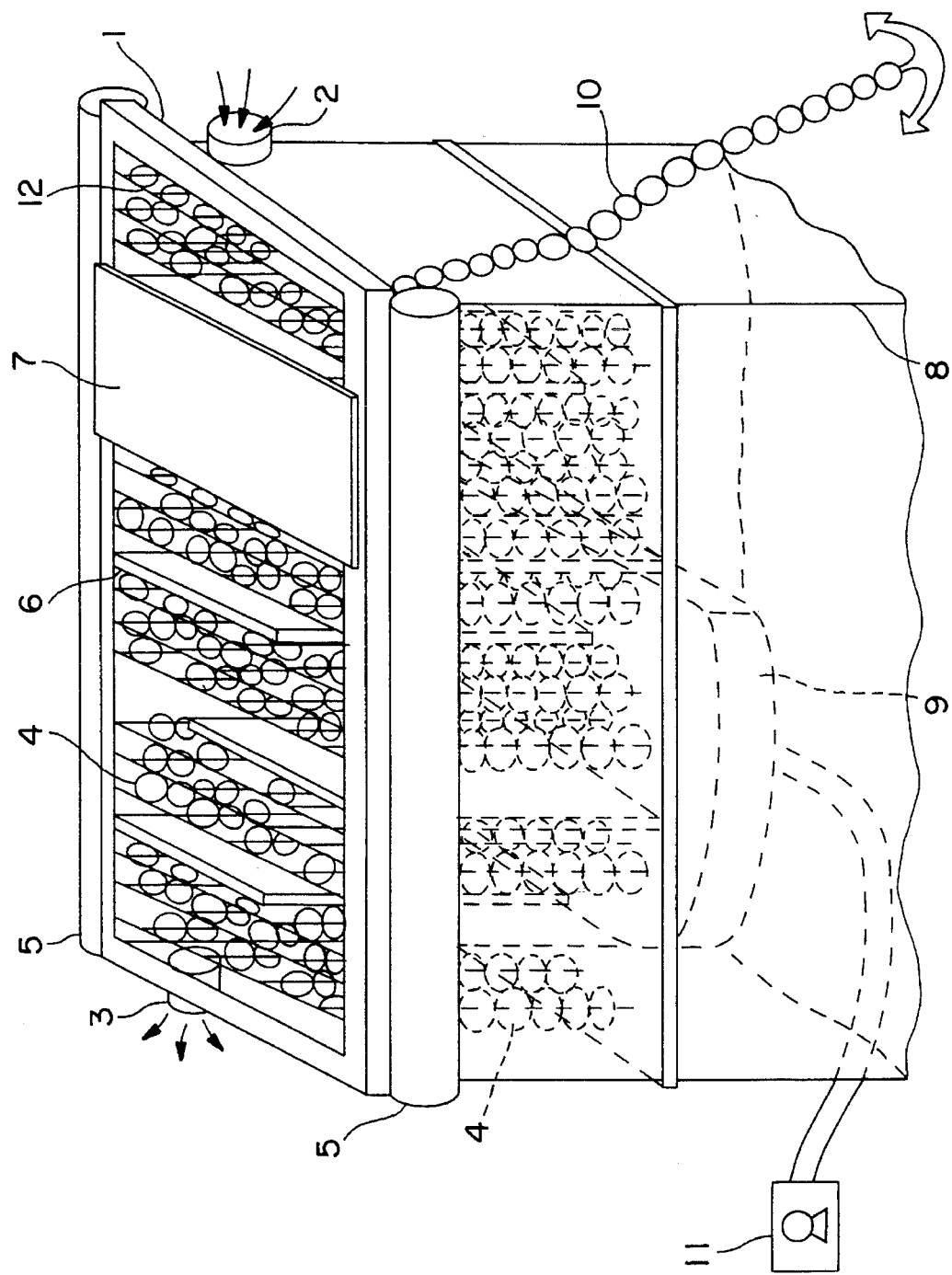
FIG. 1 is a schematic diagram of a water purification device according to this invention having an air diffusion means and a skirt.

As shown in FIG. 1, the treatment tank (1) of this invention is formed by walls enclosing a certain water area (or zone) to a certain water depth, and does not require a base.

There is no particular limitation on the material used to construct the tank provided that it can be floated in water by means of a float (5). However, wood or plastic are normally to be preferred as they are economical and easy to work with.

Even if the specific gravity of the material itself is high, the specific gravity of the whole assembly may be made to approach 1 by means of a suitable design as in the case of steel plate with hollows for example, so that it can still be floated by a float. The float may be made part of the tank in a one-piece construction, or may be separate from the tank.

The tank is provided with at least one water inlet (2) and one water outlet (3). From the viewpoint of purifying water polluted by water-bloom, the water inlet should preferably be situated in the vicinity of the water surface.

It is not essential that the tank be installed in a location where the water flows. However, water flow inside the tank may be assisted by a suction pump at the water inlet and/or a discharge pump at the water outlet. From the viewpoint of making the water flow uniformly in the tank, it is particularly preferable that a discharge means be provided. The tank may also have means for recirculating water therein, such as a circulation pump.

Preferably, during operation the fluid flow is in overall horizontal direction. For example, the device can be provided with at least one water inlet in at least one substantially vertical side wall and at least one water outlet in at least one substantially vertical wall, whereby fluid flowing from the at least one inlet to the at least one outlet is in an overall horizontal direction.

The tank may be provided with a suitable number of partitions (6) in order to increase the opportunity for polluted water to come into contact with the biological supports (4) in the tank and ensure that the water stays in the tank for a sufficient time. The partitions may be disposed in the tank in any manner provided that polluted water flows from the inlet to the outlet, but preferably, the number of partitions is 2 to 5 and the tank is divided into 3 to 6 areas (or stages).

In particular, when purifying water polluted by water-bloom, it is desirable that the water-bloom dies as it passes through the tank. For this purpose, a water area (or zone) shielded from light is preferably provided upstream inside the tank.

This light-shielded area (or zone) may easily be provided by a light shielding means (7) laid on the water surface where the tank is installed. The light shielding means may consist of a plastic sheet or plate, or a cover made of another common material having light shielding properties which causes water-bloom to die. This cover may further be a panel of solar cells which can supply electric energy for the water suction means, water discharge means or air diffusion means to be hereinafter described.

The above light-shielded area which is situated upstream is preferably provided adjacent to the minimum water area which is required for the tank to effectively function as a sedimentation area (or zone). Preferably, a partition is positioned between the sedimentation area and the light-shielded area. For example, a partition can be positioned at the boundary between the sedimentation area and the light-shielded area.

The surface area of the light-shielded area is suitably chosen with regard to the speed of passage of polluted water so that it causes water-bloom to die.

In practice, it was found that water-bloom died when light was shielded for 15 minutes or longer.

According to this invention, the biological support in the tank may be suitably selected from those known in the art depending on the polluting substances, installation site and desired degree of water purification.

Many types of biological support are known; however, a plurality of U-shaped biological supports woven on a frame as described in Japanese Tokkai Sho 62-3784 are particularly preferred (see, e.g., "Yosui to Haisui,"[Vol. 23, NO. 4, pp. 3–33 and pp. 43–81).

A plurality of these biological supports may for example be suspended from rods (12) in the upper part of the tank according to known methods, or stretched on a frame which is then fixed in the tank.

The distance between the biological supports is suitably chosen with regard to the level of pollution and the flowrate, etc. Once method for installing these supports is described in, for example, Japanese Tokkai Hei 4-222587 (Koho).

The type of biological support is selected according to the type of pollution, the required degree of purification and the items which are to be evaluated for purification. If necessary, two or more biological supports having different biological actions may also be used.

According to the present invention, it is preferable to provide an air diffusion means (9) at the bottom of the tank so that microorganisms adhering to the biological supports can efficiently bring about the oxidative decomposition of polluting substances. This air diffusion means may be suitably chosen from those known in the art. However, a diffusion means wherein a large number of air holes are provided on a surface is preferable as it produces small air bubbles. The air diffusion means is preferably positioned in an aeration area (or zone) downstream of the light shielding area. Preferably, a partition is positioned between the light-shielded area and the aeration area. For example, a partition can be positioned at the boundary between the light-shielded area and the aeration area.

Preferably, the diameter of these air bubbles is about 0.1 mm–2 mm. The amount of diffused air is preferably about 50–200 liter/min, and more preferably about 100–150 liter/min.

According to the present invention, moreover, a skirt (8) is preferably provided on the lower edge of the tank to prevent polluted water in the tank from flowing to the outside of the tank around the base before it has been sufficiently purified. The lower edge of this skirt preferably reaches to the bottom of the water, but where the water is very deep, i.e., the distance from the water surface to the bottom, the depth of the skirt may be of about the same order or greater than the maximum distance between opposed sides of the tank (the term "sides" here includes partitions) at its upper edge. When the skirt reaches to the bottom of the water, the skirt should preferably be able to lengthen and shorten so that it can follow the up and down motion of the water surface depending on the water volume. Such a skirt which is able to lengthen and shorten may easily be fabricated from for example a plastic sheet, corrugated rubber sheet or material which can be rolled and unrolled.

The purification device of this invention may be free to move in the water which it is intended to purify, but it may also be fixed in a certain water area by means of an anchor (10) or the like.

In accordance with embodiments of the present invention, the polluted water is made to circulate successively through at least one sedimentation area, at least one light-shielding area (wherein water-bloom is killed) and at least one purification area (wherein the dead water-bloom is decomposed), thereby achieving highly efficient purification.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, and of corresponding Japanese application 42217/93, are hereby incorporated by reference.

The operation and advantages of the purification device according to this invention will now be described with reference to specific examples, but it should be understood that these examples are not to be construed as limiting the scope of the invention in any way.

EXAMPLES

FIG. 1 shows a water purification device according to this invention comprising biological supports (4), light shielding means (7), air diffusion means (9) connected to pump (11) and skirt (8), the device being made to float in the water by means of floats (5). In the embodiment of FIG. 1, the device is provided with two sets of opposed vertical side walls and a plurality of vertical partitions. The water inlet (2) is provided in one side wall and the water inlet (3) is provided in an opposed side wall. Preferably, at least the water inlet is positioned to be at or near the water surface.

When polluted water flows into the purification device according to this invention, polluting substances adhere to biological supports (4) suspended from support rods (12) in the vicinity of a water inlet (2). In this process, not only organic matter but also inorganic matter such as mud and sand adhere to the supports.

Initially, the organic matter in the polluting substances is decomposed by aerobic bacteria. When more polluting substances come to adhere to the supports, the inner layer which has been decomposed by aerobic bacteria, becomes anaerobic so that decomposition by anaerobic bacteria occurs. The organic matter which acted as a binder for the adhering substances is thereby totally or partially destroyed.

Due to this process, after the adhering substances have accumulated for a certain time, they can no longer support their own weight and fall to the bottom. More polluting substances then adhere to the biological supports, and the cycle of adhesion and falling is repeated.

In the vicinity of the water inlet (2), the purification tank (1) therefore functions as a sedimentation tank.

Polluted water outside the sedimentation area enters an area shielded from light by the light shielding plate (7), adjacent partitions (6) and the biological supports (4).

Water-bloom therefore dies, and the dead water-bloom adheres to the supports (4) where it is decomposed by microorganisms.

The fine bubbles emitted by the air diffusion means (9) increase the amount of dissolved oxygen in the water so that decomposition by microorganisms and aerobic bacteria of adhering organic substances such as dead water-bloom, proceeds more smoothly.

What is claimed is:

1. A floating water purification device comprising:

a treatment tank, said treatment tank having an open bottom, side walls enclosing a region, at least one water inlet in a first vertical side wall and at least one water outlet in a second vertical side wall facing said first side wall, wherein fluid can flow through said region in a horizontal direction from said at least one water inlet to said at least one water outlet, a float which permits said tank to float in water, a plurality of U-shaped biological supports woven on a frame and positioned within said tank, at least one vertical partition dividing the tank into a plurality of areas to ensure that water will stay within the tank for a time sufficient for purification, and light-shielding means on the upper surface of said tank whereby at least part of said tank is shielded from light to provide a light-shielded area, said light-shielding means being positioned downstream of and adjacent to a water area which is capable of functioning as a sedimentation area.

2. A floating water purification device as defined in claim 1, further comprising a skirt positioned on the lower edge of said treatment tank wherein said skirt extends to a depth which is equal to or greater than the maximum distance between opposite side walls of said tank.

3. A floating water purification device as defined in claim 2, further comprising means for increasing or decreasing the depth to which said skirt extends.

4. A floating water purification device according to claim 2, wherein said skirt is a corrugated rubber sheet.

5. A floating water purification device as defined in claim 1, further comprising anchor means.

6. A floating water purification device as defined in claim 1, further comprising air diffusion means.

7. A floating water purification device according to claim 6, wherein said light-shielding means defines said light-shielded area and positioned downstream of said light-shielded area and adjacent thereto is an aeration area wherein said air diffusion means introduces air bubbles for aeration.

8. A floating water device according to claim 7, wherein a first partition is positioned between said sedimentation area and said light-shielded area and a second partition is positioned between said light-shielded area and said aeration area.

9. A floating water purification device according to claim 1, wherein said device further comprises a discharge pump means at said at least one water outlet.

10. A floating water purification device according to claim 9, wherein said light-shielding means is a panel containing solar cells which supply electric energy for the operation of said discharge pump means.

11. A floating water purification device according to claim 1, wherein said tank contains 2–5 of said partitions which divide the tank into 3–6 areas.

12. A method of purifying polluted water comprising:

placing a water purification device according to claim 1 in polluted water to be purified, whereby said at least one water inlet is positioned at the vicinity of the water surface, and circulating said polluted water through said device in a horizontal direction from said at least one water inlet to said at least one water outlet.

13. A method according to claim 12, wherein said part of said tank which is shielded by said light-shielding means is positioned a distance downstream of said at least one water inlet, said distance being sufficient to provide a region, between said light-shielded area and said at least one water inlet, which functions as a sedimentation area.

14. A method according to claim 12, wherein said polluted water exhibits water-bloom, said part of said tank which is shielded from light provides a light-shielded area within said tank, and the flow rate of polluted water through said tank is sufficient to cause water-bloom to die during passage of said polluted water through said light-shielded area.

15. A method according to claim 14, wherein the time required for passage of polluted water through said light-shielded area is greater than 15 minutes.

16. A method according to claim 12, wherein said device further comprises air diffusion means and air is diffused into said tank at a rate of 50–200 l/min.

17. A method according to claim 16, wherein air is diffused into said tank at a rate of 100–150 l/min.

18. A method according to claim 16, wherein the diameter of the diffused air bubbles is 0.1–2 mm.

19. A method of eliminating water-bloom comprising:

placing a water purification device according to claim 1 in polluted water wherein water-bloom is growing, wherein said at least one water inlet is positioned at the vicinity of the water surface, and circulating said polluted water through said device in a horizontal direction from said at least one water inlet to said at least one water outlet at a rate whereby water-bloom dies within the part of said tank which is shielded from light.

20. A floating water purification device consisting essentially of:

a treatment tank, said treatment tank having an open bottom, vertical side walls enclosing a region, at least one water inlet in a first vertical side wall and at least one water outlet in a second vertical side wall facing said first vertical side wall, wherein fluid can flow through said region in a horizontal direction from said at least one water inlet to said at least one water outlet, a float which permits said tank to float in water, a plurality of U-shaped biological supports woven on a frame and positioned within said tank, at least one vertical partition dividing the tank into a plurality of areas to ensure that water will stay within the tank for a time sufficient for purification, and light-shielding means on the upper surface of said tank whereby at least part of said tank is shielded from light to provide a light-shielded area, said light-shielding means being positioned downstream of said at least one water inlet and adjacent to a water area which is capable of functioning as a sedimentation area.

* * * * *